(12) United States Patent
Huang

(10) Patent No.: US 11,143,355 B1
(45) Date of Patent: Oct. 12, 2021

(54) MULTITIER FOLDING STAND FOR ELECTRONIC DEVICES

(71) Applicant: Cheng Yu Huang, New Taipei (TW)

(72) Inventor: Cheng Yu Huang, New Taipei (TW)

( * ) Notice: Subject to any disclaimer, the term of this patent is extended or adjusted under 35 U.S.C. 154(b) by 0 days.

(21) Appl. No.: 16/937,705

(22) Filed: Jul. 24, 2020

(51) Int. Cl.
*F16M 11/38* (2006.01)
*A47B 23/04* (2006.01)
*F16M 11/10* (2006.01)

(52) U.S. Cl.
CPC ............. *F16M 11/10* (2013.01); *F16M 11/38* (2013.01); *A47B 23/043* (2013.01)

(58) Field of Classification Search
CPC .... A47B 23/042; A47B 23/043; F16M 11/10; F16M 13/00
USPC .... 248/441.1, 433, 447, 448, 449, 454, 455, 248/456, 457, 461, 463, 464
See application file for complete search history.

(56) References Cited

U.S. PATENT DOCUMENTS

| D624,922 | S | * | 10/2010 | Hui | D14/447 |
| 8,424,464 | B2 | * | 4/2013 | Korpi | A47B 23/044 |
| | | | | | 108/9 |
| 8,991,319 | B2 | * | 3/2015 | Korpi | B64D 11/0638 |
| | | | | | 108/44 |
| 2021/0059402 | A1 | * | 3/2021 | Huang | A47B 23/042 |
| 2021/0062965 | A1 | * | 3/2021 | Huang | F16M 11/048 |

* cited by examiner

*Primary Examiner* — Alfred J Wujciak
(74) *Attorney, Agent, or Firm* — Demian K. Jackson; Jackson IPG PLLC

(57) ABSTRACT

A multitier folding stand is provided with a rectangular base (1) including two parallel toothed members (11), a transverse groove (12), two cavities (13), two detents (14), two rear bossed holes (15), and a rotatable disc (16); a pivotal platform (2); a bent support (3) pivotably secured to the platform (2); two aligned pivotal arms (4) pivotably secured to the bossed holes (15) respectively and including a lengthwise trough (43); two opposite pivotal support arms (5) including a main part (51), two pivots (52) at two ends of the main part (51) respectively, first and second bearings (53, 54) for securing the pivots (52) to the base (1) respectively, a sliding groove (55) in the main part (51), a first hole (56) through a first end of the sliding groove (55), and a sleeve (58) in the first hole (56); and two opposite pivotal legs (6).

2 Claims, 7 Drawing Sheets

MULTITIER FOLDING STAND FOR ELECTRONIC DEVICES

BACKGROUND OF THE INVENTION

1. Field of the Invention

The invention relates to stands and more particularly to a multitier folding stand for one or more electronic devices including a notebook computer, mobile phone(s), a keyboard, and a tablet computer to be placed for support.

2. Description of Related Art

Mobile electronic devices (e.g., tablet computers and smart phones) are used by people in daily lives. For watching video more comfortably, a stand is provided on a bottom of an electronic device as support.

A user may need to move the stand with the hands. When the user needs to place the electronic device on the table, the user may use one hand to hold the body of the electronic device, and the other hand to move the stand in order to change position. However, it is inconvenient in use. Further, the conventional stand only allows a single electronic device such as a tablet computer to be placed for support.

The present inventor filed U.S. patent application Ser. No. 16/553,316 and U.S. patent application Ser. No. 16/553,321 both related to stand for electronic devices. While the stands enjoy its success in the market, continuing improvements in the exploitation of stand of this type are constantly sought.

SUMMARY OF THE INVENTION

It is therefore one object of the invention to provide a multitier folding stand comprising a rectangular base including two parallel toothed members on a top, a transverse groove on the top adjacent a front end, two opposite cavities on a bottom, two detents at edges of the cavities respectively, two bossed holes on two rear corners respectively, and a central rotatable disc on the bottom; a rectangular platform including two spaced wells on a front end, two fasteners through the wells respectively to fasten the platform and the base together, and a pivotal plate between the wells; a bent support including two fasteners for pivotably securing two ends thereof to the bottom of the platform wherein the support is configured to selectively position in teeth of the toothed members when the platform mounted on the base is pivoted; two aligned pivotal arms, each including a pivot hole at a first end pivotably secured to the bossed hole by disposing a pivot through the pivot hole, and a lengthwise trough wherein in a non-use position, second ends of the pivotal arms are adjacent to each other; two opposite pivotal support arms, each including a main part, two pivots at two ends of the main part respectively, first and second bearings for securing the pivots to the bottom of the base respectively, a sliding groove in the main part, a first hole through a first end of the sliding groove, and a sleeve in the first hole wherein the support arms are configured to pivot to dispose in the cavities in the non-use position or dispose at an angle of 90 degrees with respect to the base in a use position; and two opposite pivotal legs, each including a main part facing the main part of the support arm, a second hole through the main part of the pivotal leg and aligned with the first hole, a rod fastened in the sleeve by passing through the first and second holes, and a fastener driven through an end of an arm into the support arm to fasten the support arm in an extended position wherein the main part of the leg is disposed in the sliding groove in the non-use position or fully extended in the use position.

The above and other objects, features and advantages of the invention will become apparent from the following detailed description taken with the accompanying drawings.

DETAILED DESCRIPTION OF THE INVENTION

Figure 1:
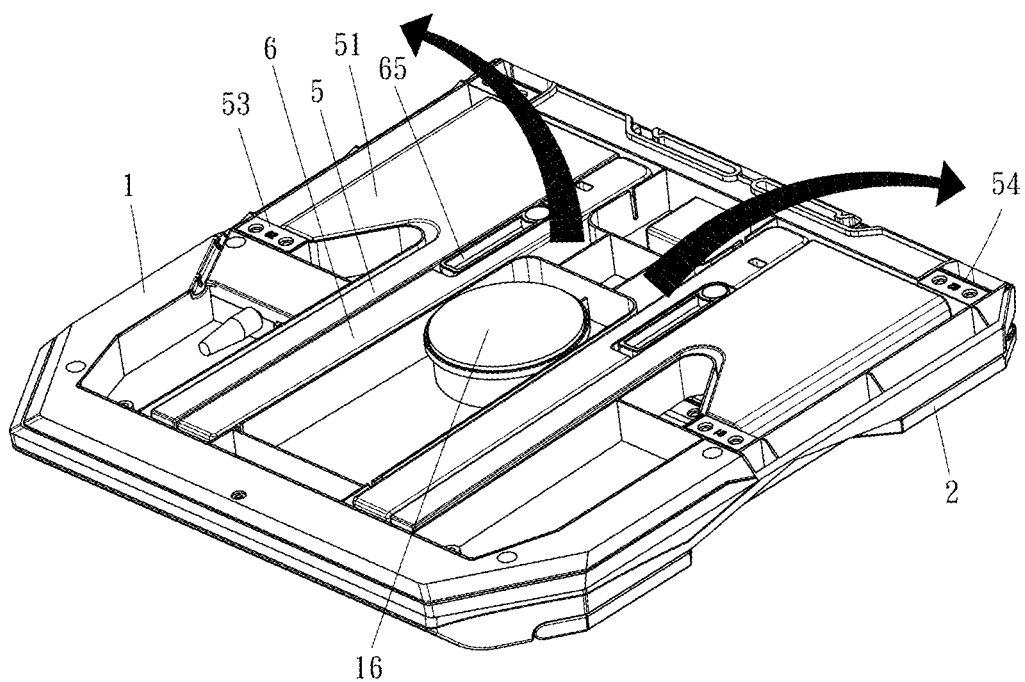
FIG. 1 is a bottom perspective view of a multitier folding stand according to the invention, support arms and legs being collapsed.
Figure 2:
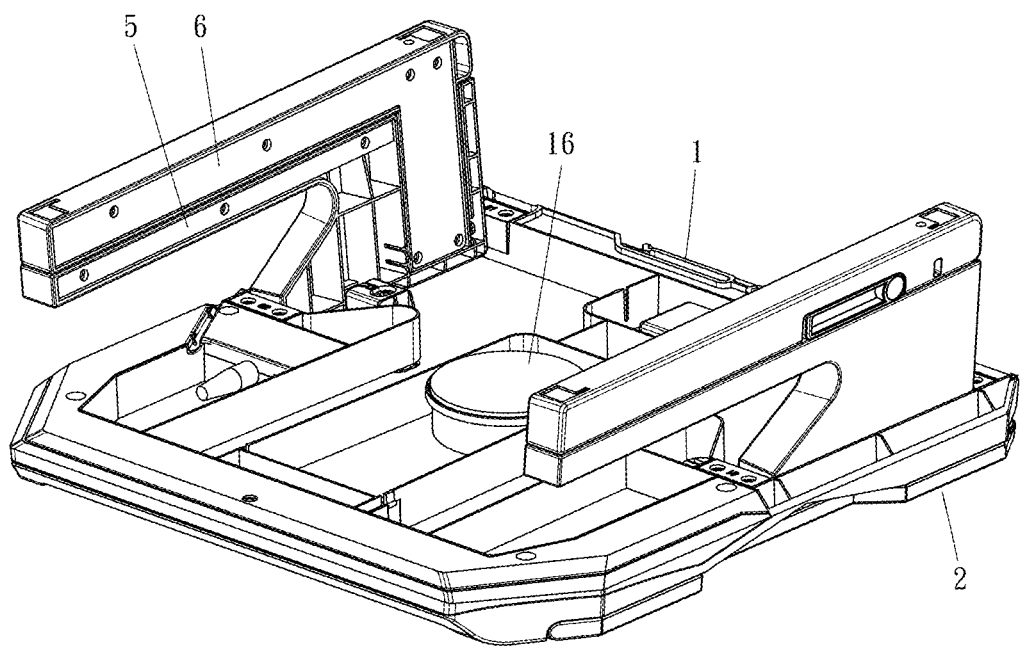
FIG. 2 is a view similar to FIG. 1, the support arms and the legs being mounted.
Figure 3:
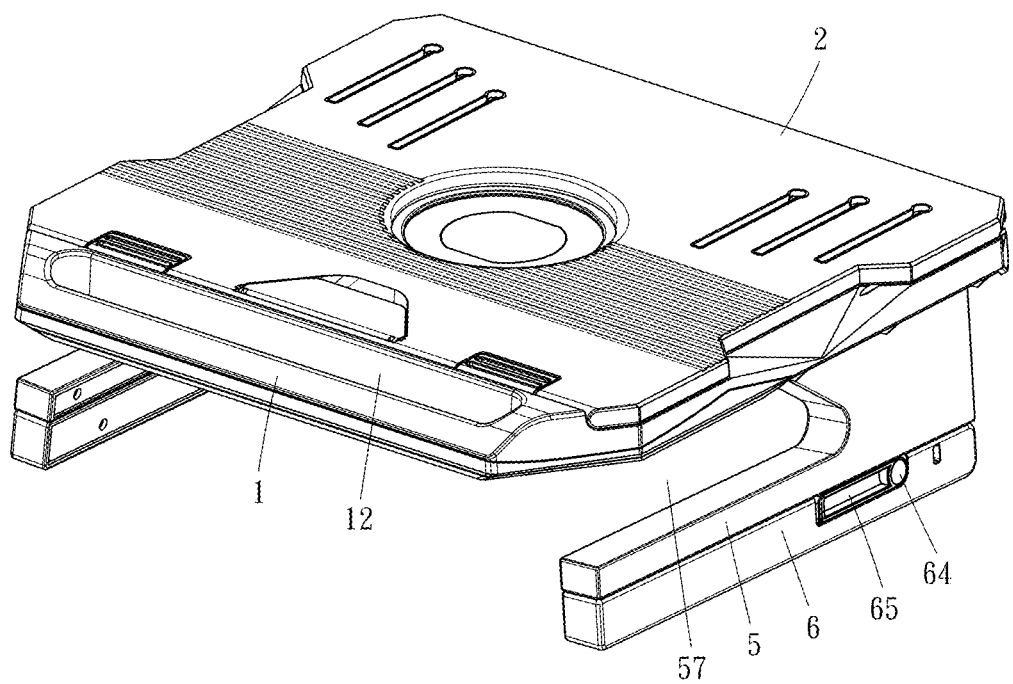
FIG. 3 is a front perspective view of the assembled multitier folding stand.
Figure 4:
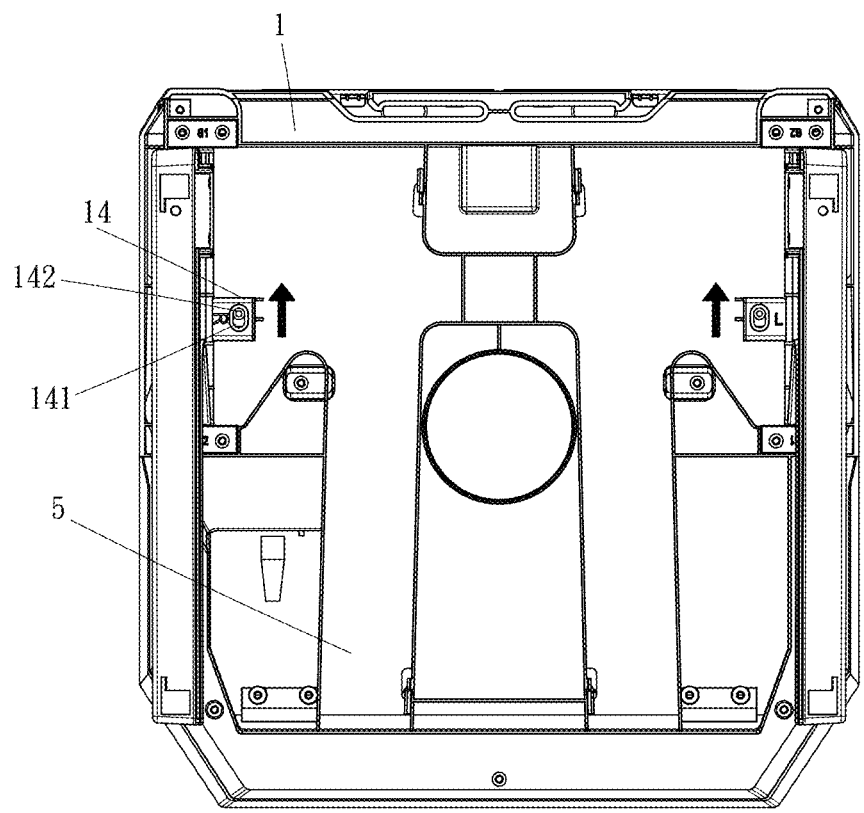
FIG. 4 is a top plan view of FIG. 2.
Figure 5:
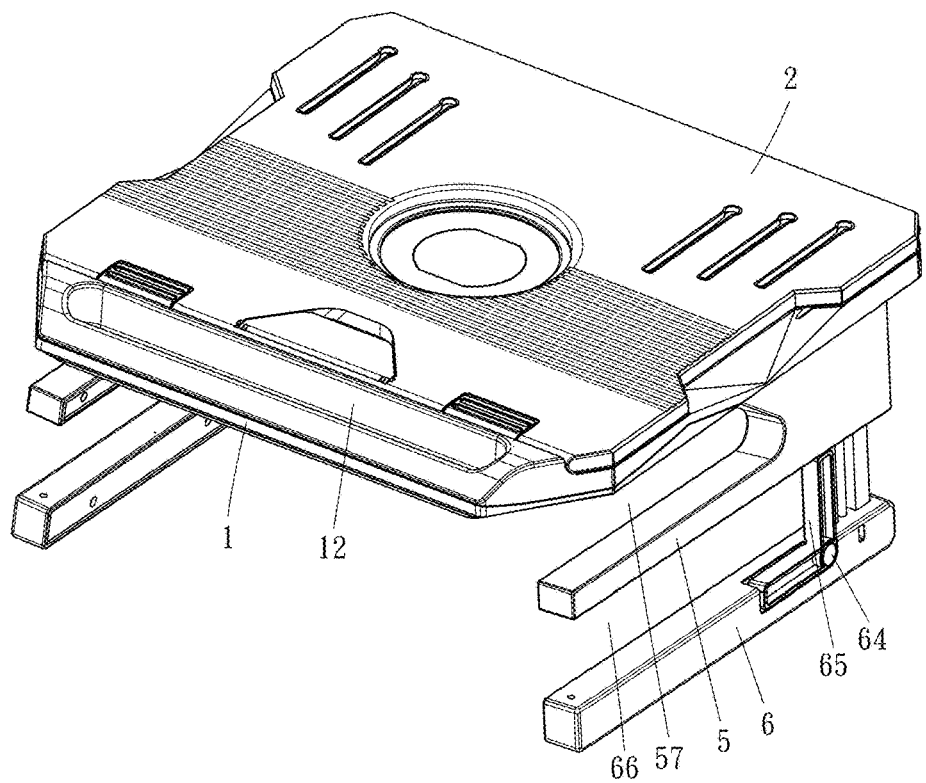
FIG. 5 is a top perspective view of the multitier folding stand, the legs being fully extended downward to form two tiers.
Figure 6:
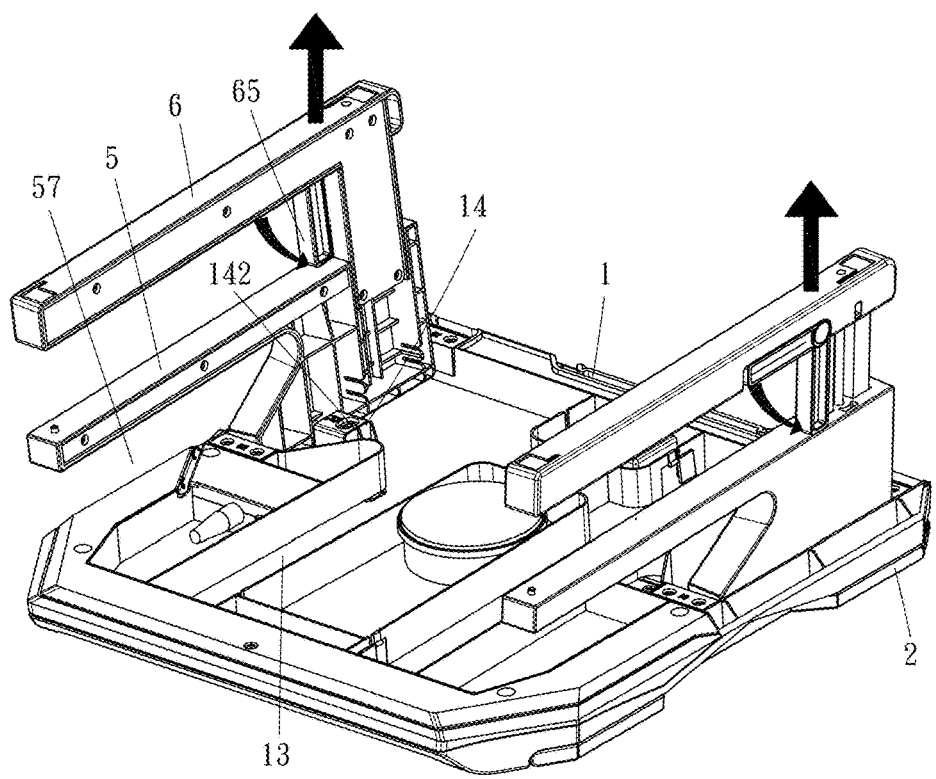
FIG. 6 is a bottom perspective view of the multitier folding stand of FIG. 5.
Figure 7:
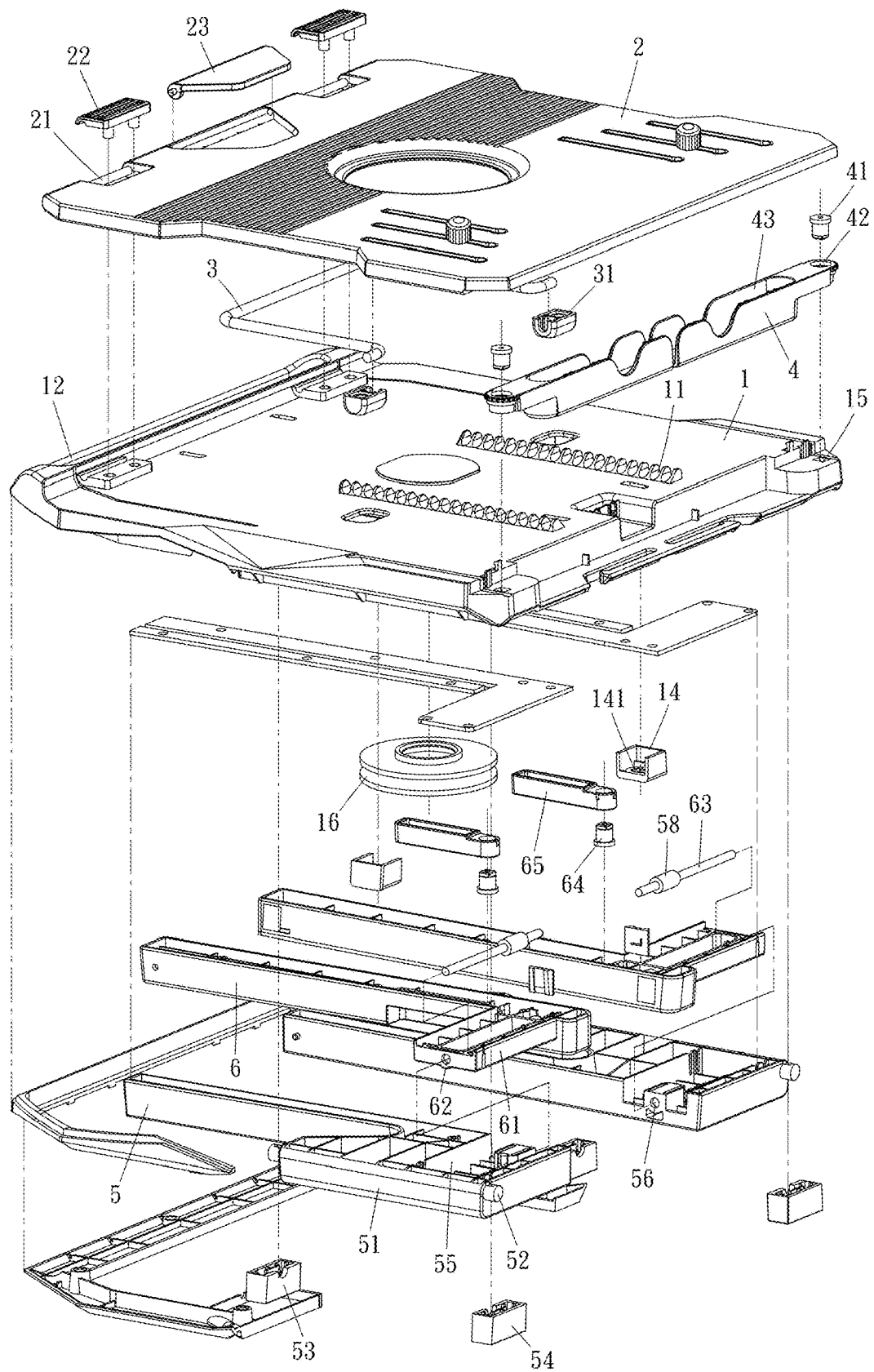
FIG. 7 is an exploded view of the multitier folding stand.
Figure 8:
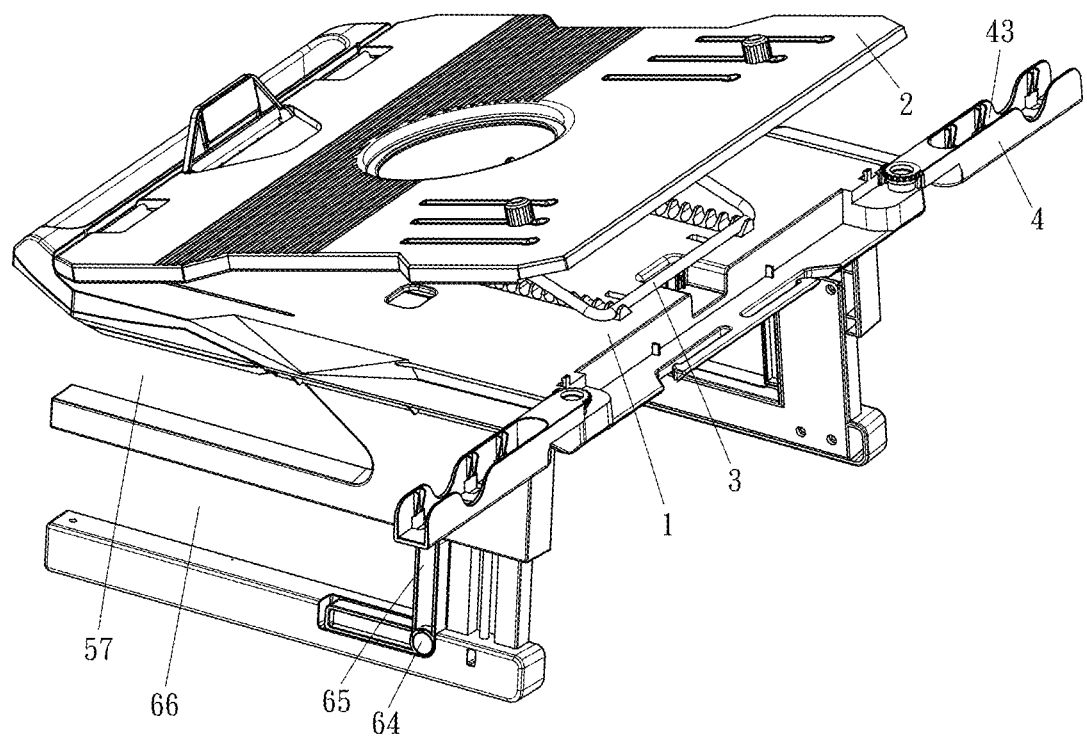
FIG. 8 is a perspective view of the multitier folding stand, the pivotal arms being fully extended by pivoting and the platform being slightly pivoted to form an inclined surface.
Figure 9:
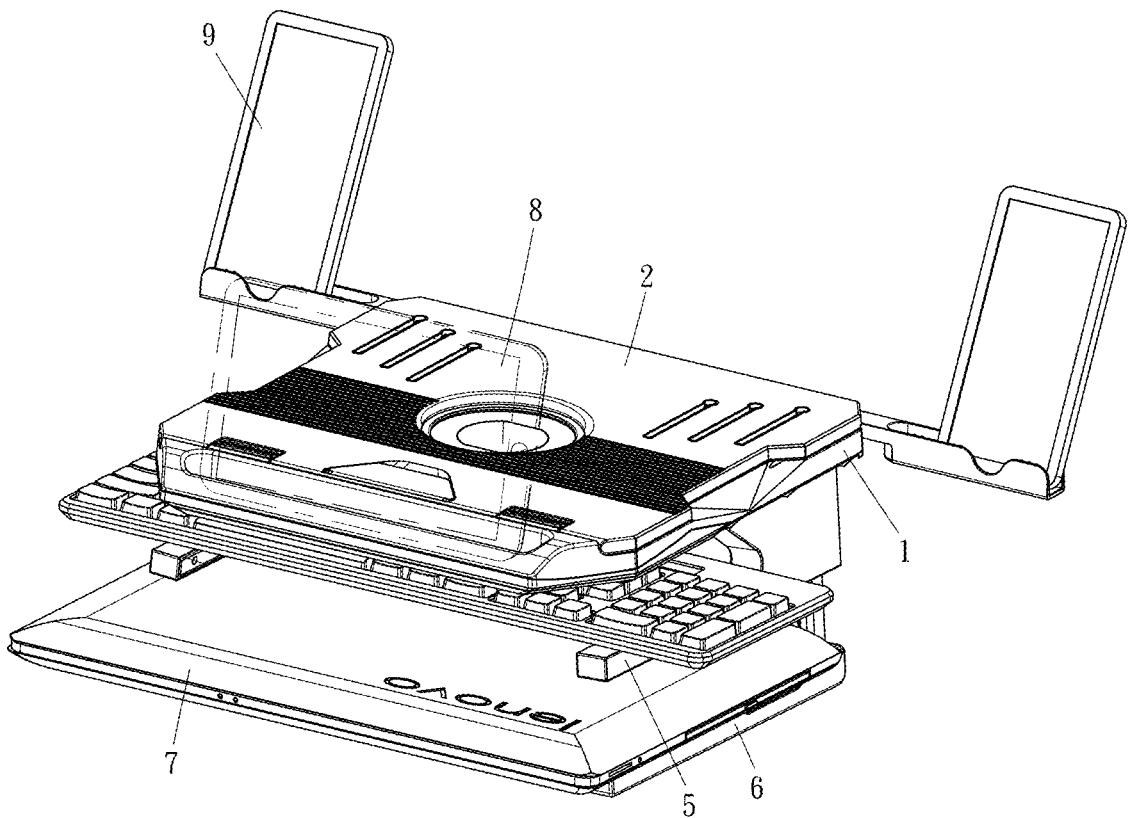
FIG. 9 is a view similar to FIG. 8 showing a laptop, a keyboard and two smart phones placed for support.

Referring to FIGS. 1 to 11, a multitier folding stand in accordance with the invention comprises a base 1, a platform 2, a support 3, two pivotal arms 4, two opposite pivotal support arms 5, and two opposite pivotal legs 6 as discussed in detail below.

The rectangular base 1 includes two parallel toothed members 11 on a top, a transverse groove 12 on the top adjacent a front end, two opposite cavities 13 on a bottom, two detents 14 at edges of the cavities 13 respectively, two bossed holes 15 on two rear corners respectively, and a central rotatable disc 16 on the bottom. The detent 14 includes an elongated hole 141 and a rod 142 slidably passing through the elongated hole 141. Thus, the detent 14 may move back or forth.

The rectangular platform 2 includes two spaced wells 21 on a front end, two fasteners 22 through the wells 21 respectively to fasten the platform 2 and the base 1 together, and a pivotal plate 23 between the wells 21.

The bent support 3 includes two fasteners 31 for pivotably securing two ends thereof to the bottom of the platform 2. The support 3 can be selectively positioned in the teeth of the toothed members 11 when the platform 2 mounted on the base 1 is pivoted. Thus, an inclined angle of the platform 2 with respect to the base 1 can be adjusted, i.e., an inclined angle of an electronic device such as laptop 7 or tablet computer 8 placed on the platform 2 being adapted to adjust.

The pivotal arms 4 are aligned and each pivotal arm 4 includes a pivot hole 42 at one end pivotably secured to the bossed hole 15 by disposing a pivot 41 through the pivot hole 42, and a lengthwise trough 43. In a non-use position, the other ends of the pivotal arms 4 are adjacent to each other. To the contrary, in a first use position, the pivotal arms 4 are pivoted to the left side and the right side so that two smart phones 9 can have their bottoms disposed in the troughs 43 for support.

The support arm 5 includes a main part 51, two pivots 52 at two ends of the main part 51 respectively, first and second bearings 53, 54 for securing the pivots 52 to the bottom of the base 1 respectively so that the support arms 5 may pivot to dispose in the cavities 13 in a non-use position or dispose at an angle of 90 degrees with respect to the base 1 in a ready to use position, a sliding groove 55 in the main part 51, a hole 56 through one end of the sliding groove 55, and a metal sleeve 58 in the hole 56.

The leg 6 includes a main part 61 facing the main part 51 and a hole 62 through the main part 61 and aligned with the hole 56. The main part 61 (i.e., the leg 6) is disposed in the sliding groove 55 in a non-use position or fully extended in a ready to use position. The leg 6 further comprises a metal rod 63 adapted to fasten in the sleeve 58 by passing through the holes 56, 62, and a fastener 64 driven through an end of an arm 65 into the support arm 5. Thus, the support arm 5 is secured in the extended position.

A tablet computer 8 or one or two smart phones 9 can be placed in the transverse groove 12 for support. The detents 14 may move forward to lock the support arm 5 when it pivots to dispose at an angle of 90 degrees with respect to the base 1 in the ready to use position. The rotatable disc 16 is adapted to allow the stand to rotate when the support arms 5 are in the ready to use position, so that a viewing angle can be adjusted.

As shown in FIG. 1 specifically, the stand is collapsed for saving space in a non-use position.

Figure 10:
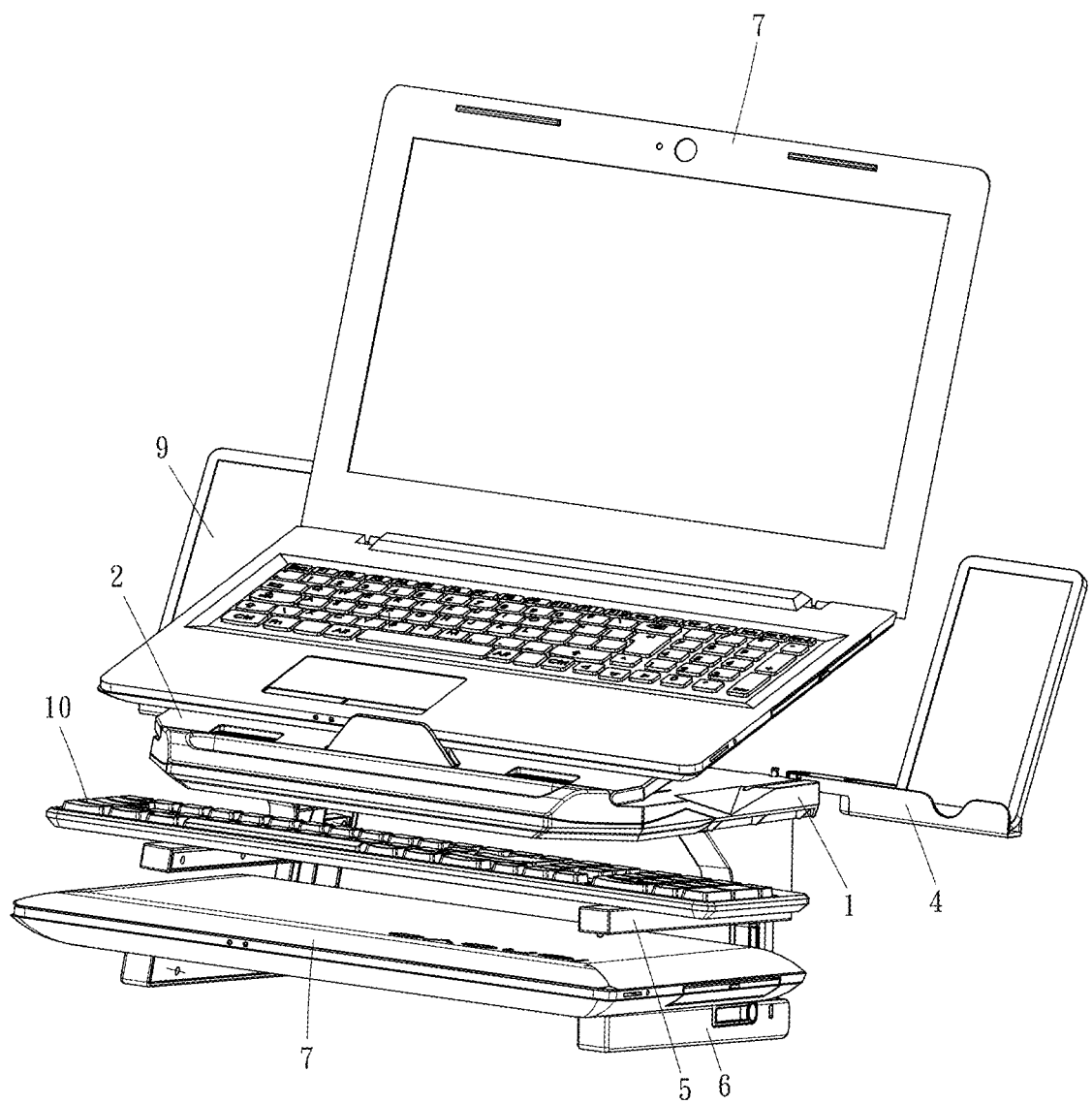
FIG. 10 is a view similar to FIG. 9 further showing another laptop, the laptop, the keyboard and the smart phones placed for support.

As shown in FIG. 10 specifically, in a ready to use position, the platform 2 is tilted with an open first laptop 7 placed thereon, a second laptop 7 disposed in a space between the legs 6 and the support arms 5, and two smart phones 9 placed in the pivotal arms 4.

Figure 11:
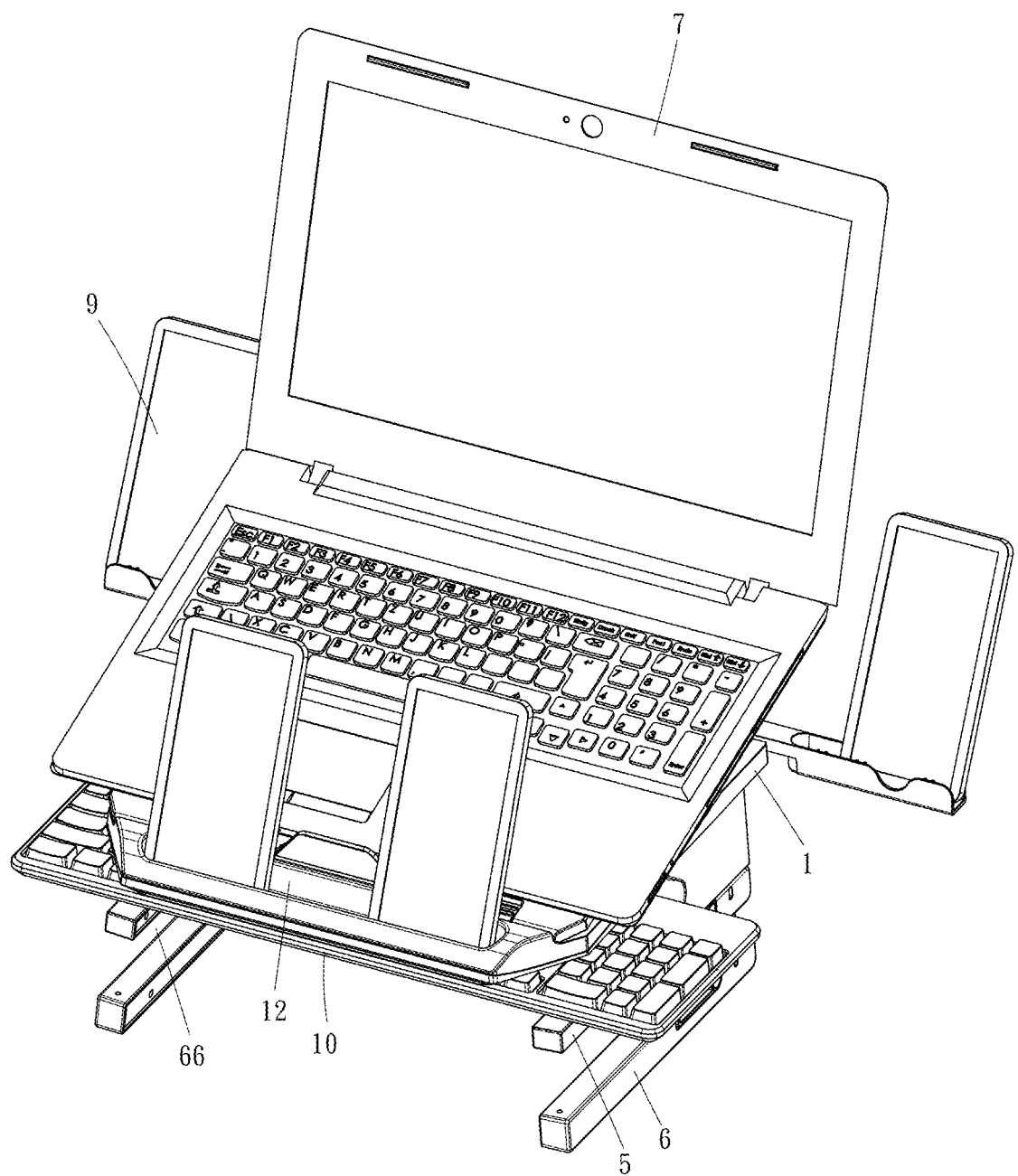
FIG. 11 is a perspective view of the multitier folding stand showing two laptops, a keyboard and four smart phones placed for support.

As shown in FIG. 11 specifically, in a ready to use position, the platform 2 is tilted with an open laptop 7 placed thereon, a keyboard 10 disposed in a space between the base 1 and the support arms 5, two smart phones 9 placed in the pivotal arms 4, and another two mart phones 9 placed in the transverse groove 12.

While the invention has been described in terms of preferred embodiments, those skilled in the art will recognize that the invention can be practiced with modifications within the spirit and scope of the appended claims.

What is claimed is:

1. A multitier folding stand, comprising:
   a rectangular base (1) including two parallel toothed members (11) on a top, a transverse groove (12) on the top adjacent a front end, two opposite cavities (13) on a bottom, two detents (14) at edges of the cavities (13) respectively, two bossed holes (15) on two rear corners respectively, and a central rotatable disc (16) on the bottom adapted to rotate the stand;
   a rectangular platform (2) including two spaced wells (21) on a front end, two fasteners (22) through the wells (21) respectively to fasten the platform (2) and the base (1) together, and a pivotal plate (23) between the wells (21);
   a bent support (3) including two fasteners (31) for pivotably securing two ends to the bottom of the platform (2) wherein the support (3) is configured to selectively position in teeth of the toothed members (11) when the platform (2) mounted on the base (1) is pivoted;
   two aligned pivotal arms (4), each including a pivot hole (42) at a first end pivotably secured to the bossed hole (15) by disposing a pivot (41) through the pivot hole (42), and a lengthwise trough (43) wherein in a non-use position, second ends of the pivotal arms (4) are adjacent to each other;
   two opposite pivotal support arms (5), each including a main part (51), two pivots (52) at two ends of the main part (51) respectively, first and second bearings (53, 54) for securing the pivots (52) to the bottom of the base (1) respectively, a groove (55) in the main part (51), a first hole (56) through a first end of the groove (55), and a sleeve (58) in the first hole (56) wherein the support arms (5) are configured to pivot to dispose in the cavities (13) in the non-use position or dispose at an angle of 90 degrees with respect to the base (1) in a use position; and
   two opposite pivotal legs (6), each including a main part (61) facing the main part (51) of the support arm (5), a second hole (62) through the main part (61) of the pivotal leg (6) and aligned with the first hole (56), a rod (63) fastened in the sleeve (58) by passing through the first and second holes (56, 62), and a fastener (64) driven through an end of an arm (65) into the support arm (5) to fasten the support arm (5) in an extended position wherein the main part (61) of the leg (6) is disposed in the groove (55) in the non-use position or fully extended in the use position.

2. The multitier folding stand of claim 1, wherein the detent (14) includes an elongated hole (141) and a rod (142) slidably passing through the elongated hole (141), so that the detent (14) is configured to move back or forth.

* * * * *